United States Patent
Guenot et al.

(10) Patent No.: US 6,576,164 B2
(45) Date of Patent: *Jun. 10, 2003

(54) METHOD OF COOLING AN OPTICAL FIBER WHILE IT IS BEING DRAWN

(75) Inventors: Philippe Guenot, Maisons Laffitte (FR); Marc Nicolardot, Pierrelaye (FR); Jean-François Bourhis, Taverny (FR); Eric Lainet, Maisons Laffitte (FR)

(73) Assignee: Alcatel, Paris (FR)

( * ) Notice: Subject to any disclaimer, the term of this patent is extended or adjusted under 35 U.S.C. 154(b) by 147 days.

This patent is subject to a terminal disclaimer.

(21) Appl. No.: 09/736,454

(22) Filed: Dec. 15, 2000

(65) Prior Publication Data

US 2001/0005993 A1 Jul. 5, 2001

(30) Foreign Application Priority Data

Dec. 30, 1999 (FR) .............................. 99 16724

(51) Int. Cl.⁷ ............................... B29D 11/00
(52) U.S. Cl. ...................... 264/1.24; 65/435
(58) Field of Search ................ 264/1.1, 1.24, 264/1.28, 1.29; 65/385, 435

(56) References Cited

U.S. PATENT DOCUMENTS

| 5,928,574 A | 7/1999 | DiMarcello et al. |
| 6,010,741 A | 1/2000 | Rosenkranz et al. |

FOREIGN PATENT DOCUMENTS

| EP | 0 887 319 A1 | 12/1998 |
| JP | 580 09 836 A | 1/1983 |
| JP | 060 56 456 A | 3/1994 |
| JP | 09 077 527 A | 3/1997 |
| JP | 091 42 890 A | 6/1997 |
| JP | 100 67 531 A | 3/1998 |
| JP | 102 59 036 A | 9/1998 |

Primary Examiner—Matthieu D. Vargot
(74) Attorney, Agent, or Firm—Sughrue Mion, PLLC

(57) ABSTRACT

A method of cooling an optical fiber while it is being drawn through contact with at least one cooling fluid in at least one cooling area, wherein said method is such that fast cooling, i.e. cooling that is faster than cooling in the surrounding air, is followed by slow cooling, i.e. cooling slower than cooling in the surrounding air, the temperature of the fiber in an intermediate area between the two cooling areas lying in the range 1200° C. to 1700° C. in the case of silica glass fibers.

15 Claims, 3 Drawing Sheets

METHOD OF COOLING AN OPTICAL FIBER WHILE IT IS BEING DRAWN

The present invention relates to a method of cooling an optical fiber during drawing through contact with at least one cooling fluid in at least one cooling area.

BACKGROUND OF THE INVENTION

There are various categories of optical fiber: optical fibers based on oxide glass, optical fibers based on fluoride glass, and plastics material optical fibers based on polymer materials. Optical fiber based on oxide glass, usually silica glass, is manufactured by drawing a heated preform, which is a large cylinder of silica glass, optionally at least partly doped, whose diameter generally lies in the range 20 mm to 200 mm and whose length generally lies in the range 300 mm to 2000 mm. FIG. 1 is a diagrammatic view of a drawing tower 1. A preform 2 is melted in a drawing furnace 3 which heats the preform to a temperature of approximately 2000° C. A fiber 7 obtained in this way is cooled initially by the surrounding air, then in at least one cooling device 4, and finally by the surrounding air again, before it is fed into a coating device 5. The position of the cooling device 4 in the drawing tower 1 is generally optimized to obtain the correct fiber temperature for resin coating. The coating device 5 forms the coating of the fiber 7 from at least one coating resin which is usually cured by ultraviolet light. The device 5 generally includes at least one injection device (5a, 5c) followed by at least one curing device (5b, 5d). In the situation shown in FIG. 1, the device 5 includes a primary resin injection device 5a followed by a device 5b for curing said resin by ultraviolet light, and then a secondary resin injection device 5c followed by a device 5d or curing said resin by ultraviolet light. Finally, a coated optical fiber 8 is pulled by a capstan 6 and then wound onto a take-up spool 9.

The devices under the drawing furnace 3, which are on a common downward vertical axis Z, are generally identified by their position relative to the bottom of the drawing furnace 3, as indicated by the dimension z. All the components of the device shown in FIG. 1 are well-known to the person skilled in the art. Others, which are not shown, are also well-known to the person skilled in the art. Thus, for example, means for measuring the diameter of the bare and/or coated fiber, means for measuring the eccentricity of the fiber within its primary and/or secondary coating, and means for measuring the temperature of the fiber at a given distance along the axis are part of the prior art.

Cooling must reduce the temperature of the fiber leaving the drawing furnace to a temperature compatible with application of the coating resin, i.e. a temperature of the order of 50° C. The temperature of the fiber leaving the drawing furnace is high, generally of the order of 1000° C. to 2000° C. for a silica-based fiber, depending on the drawing furnace and the drawing speed used. Cooling the fiber between leaving the drawing furnace and entering the coating device is one of the major problems to be solved in drawing fibers, especially if it is required to increase the drawing speed. It is well-known that the attenuation of the fiber depends on the cooling conditions, and moreover, if the temperature of the fiber on entering the coating device is too high, this can lead to problems both with the eccentricity of the fiber in its coating and with the quality of said coating. The speed at which silica-based fibers are drawn industrially, which was 300 meters per minute (m/min) a few years ago, has increased more and more, and is now of the order of 1500 m/min or more. This tendency is still apparent, associated with increasing productivity, which is one of the major objectives of the optical fiber industry.

The principle of the process for fabricating optical fibers based on fluoride glass is the same, but the preform is generally smaller, generally having a diameter of 15 mm to 20 mm and a maximum length of a few centimeters to a few tens of centimeters, for example 10 cm, and the temperature on leaving the drawing furnace generally lies in the range 300° C. to 450° C. The same technical problem can arise in this case. Similarly, the same technical problem can arise in the fabrication of optical fibers based on polymer materials, in which the preform generally has a diameter of a few tens of millimeters, for example 80 mm, and a maximum length of a few tens of centimeters, for example 50 cm, and the temperature on leaving the drawing furnace generally lies in the range 200° C. to 250° C. The remainder of the description refers to optical fibers based on silica, but identical reasoning applies to other types of optical fiber, including optical fibers based on oxide glasses other than silica.

Various devices have been used to cool silica-based fiber. One solution would be to increase the area of heat exchange between the fiber to be cooled and the surrounding air, in particular by increasing the distance between the drawing furnace and the coating device. However, this would entail increasing the height of the drawing towers currently used, which would be much too costly, especially in terms of the investment required.

Another solution is to improve the efficiency of cooling over the existing distance between the drawing furnace and the coating device. In addition to simple cooling by the surrounding air, which proves to be highly inadequate for the drawing towers currently used, the common principle of various devices used in the industry (as illustrated by European Patent Application EP-A1-0 079 186, for example) consists in injecting a gas radially towards the surface of the fiber at a given distance from the outlet of the drawing furnace and causing said gas to flow upwards or downwards over a particular length of the fiber, inside a heat exchange tube. As is well-known to the person skilled in the art, heat is transferred because of the thermal conductivity of said gas, which gas is generally air, carbon dioxide, nitrogen, argon, or helium, and is preferably helium. The periphery of the tube is preferably cooled by a cooling fluid, which is generally water. By way of example, U.S. Pat. No. 4,761, 168 describes an improvement to such systems in which the gas is caused to flow along the fiber in a heat exchange tube of particular shape, which ensures regular renewal of the boundary layer of gas flowing along the fiber. The improvement is aimed at improving the efficiency of heat exchange.

One of the main problems encountered in subsequent use of optical fiber cooled in the above way is that the cooling imposed on the fiber during its fabrication, on leaving the drawing furnace and before passing through the coating furnace, significantly increases the level of Rayleigh back scattering associated with the fiber and therefore increases the major part of the attenuation of the optical fiber ready for use. It is known in the art that the attenuation of optical fiber at the wavelengths used, whether close to 1310 nm or to 1550 nm, must be as low as possible for optimum transmission of optical signals in said fiber.

That is why several solutions have been proposed to the problem of defining cooling profiles which are obtained by particular methods and/or devices and which minimize Rayleigh back scattering in the fiber. At least partial use of slow cooling profiles is generally proposed, meaning profiles that are slower than those obtained for cooling by the surrounding air. Patent Application DE-A1-3 713 029, for example, teaches slow cooling on leaving the drawing furnace.

Such methods are not satisfactory, however, in that they do not achieve sufficient reduction of the attenuation compared to the theoretical minimum attenuation.

OBJECTS AND SUMMARY OF THE INVENTION

An object of the present invention is to alleviate the above drawbacks of prior art cooling systems by improving the cooling of an optical fiber during drawing. One particular object of the invention is to reduce Rayleigh back scattering significantly, compared to prior art cooling systems, and therefore to reduce the attenuation of the fiber fabricated by drawing using the cooling method of the invention.

To this end, the invention provides a method of cooling an optical fiber during drawing, through contact with at least one cooling fluid in at least one cooling area, the method comprising effecting fast cooling, i.e. cooling that is faster than cooling in the surrounding air, from an initial temperature of the fiber to an intermediate temperature of said fiber in a fast cooling area, followed by slow cooling, i.e. cooling slower than cooling in the surrounding air, from an intermediate temperature of the fiber to a final temperature of said fiber, in a slow cooling area, the temperature of the fiber in an intermediate area between the two cooling areas lying in the range 1200° C. to 1700° C. in the case of fibers based on silica glass, in the range 200° C. to 400° C. in the case of fibers based on fluoride glass, or in the range 150° C. to 250° C. in the case of fibers based on polymer materials.

The temperature of the fiber in the intermediate area is preferably substantially equal to a "critical" temperature such that the attenuation of the fiber obtained by the drawing method is a minimum.

In other words, the above temperature, referred to as the critical temperature, is related to the glass transition temperature associated with Rayleigh back scattering in the core of the fiber. The glass transition temperature associated with Rayleigh back scattering is a thermodynamic parameter characteristic of the disorder of the glass, and more precisely of variations in density which contribute to Rayleigh back scattering. The state of disorder achieved during solidification of the glass of the core of the fiber is that found in the finished fiber after drawing and the aim is to reduce the variations in density. The method of the invention advantageously provides better control over cooling of the optical fiber, which minimizes variations in the density of the glass.

One advantage of the method of the invention is that it complies with economic constraints, which limit the height of the tower available for cooling and require high drawing speeds. The presence of a fast cooling area eliminates the problem of the height of the drawing tower and/or the drawing speed.

Another advantage of the method of the invention is that a fast cooling area between the drawing furnace and a slow cooling area significantly improves the attenuation of the fiber obtained by the method of the invention, other conditions being equal. It is important to apply the fast cooling over a range of temperatures higher than said critical temperature, because if quenching is effected at the critical temperature, or at a lower temperature, the effect on Rayleigh back scattering can be disastrous and the attenuation of the fiber finally obtained can be greatly increased.

The length of fiber in the intermediate area is preferably as short as possible, given the technological constraints on the drawing tower.

The fast cooling of the fast cooling area is at least as fast, and preferably faster, than cooling in the surrounding air, at least locally in the vicinity of the critical temperature. In other words, the instantaneous slope dT/dt of fast cooling, where T is the temperature of the fiber and t is time, has, at least locally in the vicinity of the critical temperature, a higher absolute value for such cooling than said instantaneous slope for cooling the fiber in the surrounding air. Said instantaneous slope has a higher absolute value for such cooling than said instantaneous slope for cooling the fiber in the surrounding air, preferably on average in the fast cooling area, more preferably in the major part of the fast cooling area, and even more preferably in virtually all of the fast cooling area.

The slow cooling of the slow cooling area is at least as slow, and preferably slower, than cooling in the surrounding air, at least locally, in the vicinity of the critical temperature. As a general rule, the instantaneous slope dT/dt of slow cooling, where T is the temperature of the fiber and t is time, has, at least locally in the vicinity of the critical temperature, a lower absolute value for such cooling than said instantaneous slope for cooling the fiber in the surrounding air. Said instantaneous slope generally has a lower absolute value for such cooling than said instantaneous slope for cooling the fiber in the surrounding air, preferably on average in the slow cooling area, more preferably in the major part of the slow cooling area, and even more preferably in virtually all of the slow cooling area.

In one embodiment, at least locally in the vicinity of the critical temperature, the ratio of the instantaneous slopes dT/dt for fast cooling in the fast cooling area and for cooling in the surrounding air, where T is the temperature of the fiber and t is time, is generally greater than 1, preferably greater than 1.1, and more preferably in the range 1.2 to 10.

The initial temperature of the fiber at the entry of the fast cooling area is advantageously approximately equal to the critical temperature, generally plus 250° C. to 350° C., typically plus approximately 300° C.

In one embodiment, at least locally in the vicinity of the critical temperature, the ratio of the instantaneous slopes dT/dt for slow cooling in the slow cooling area and for cooling in the surrounding air, where T is the temperature of the fiber and t is time, is generally less than 1, preferably less than 0.9, and more preferably lies in the range 0.05 to 0.8 in the slow cooling area. However, in the context of the invention, the slow cooling area can also be a heating area, i.e. in at least part of said slow cooling area the ratio of the instantaneous slopes dT/dt for slow cooling and for cooling in the surrounding air, where T is the temperature of the fiber and t is time, can be negative.

The final temperature of the fiber on leaving the slow cooling area is advantageously approximately equal to the critical temperature, generally minus 50° C. to 950° C., typically minus approximately 500° C.

In the case of an ideal structural model of the glass, the slope dT/dt in the fast cooling area must ideally be as steep as possible, i.e. quasi-infinite; conversely, the slope dT/dt in the slow cooling area must ideally be as level as possible, i.e. quasi-zero. The limitations of the material, the constraints of the device and the non-ideal nature of the actual vitreous structure lead to said slopes having intermediate values, corresponding to the values indicated hereinabove. The exact temperature profiles within the fast and slow cooling areas could be adapted more closely to obtain the maximum reduction of attenuation, for example by sub-dividing said areas into sub-areas with locally tailored slopes. In the example described hereinafter, the device is restricted to two homogeneous areas.

The critical temperature depends primarily on the composition of the fiber. The applicant has determined that, for a standard silica-based stepped index optical fiber conforming to CCITT Standard G.652, said critical temperature generally lies in the range 1350° C. to 1550° C. and preferably in the range 1450° C. to 1550° C. It is 1500±20° C., for example.

The present invention, although described with reference to silica glass fibers, applies equally to the other categories of fiber described previously, the temperature ranges being adapted accordingly by the person skilled in the art.

Cooling, whether fast or slow, is effected by any device known to the person skilled in the art. The cooling fluid is generally chosen from the group comprising air, carbon dioxide, argon, nitrogen and helium. Said fluid is preferably helium.

BRIEF DESCRIPTION OF THE DRAWINGS

The invention will be better understood and its other features and advantages will become apparent on reading the following description, which is given by way of non-limiting example and with reference to FIGS. 1 to 3.

MORE DETAILED DESCRIPTION

Figure 1:
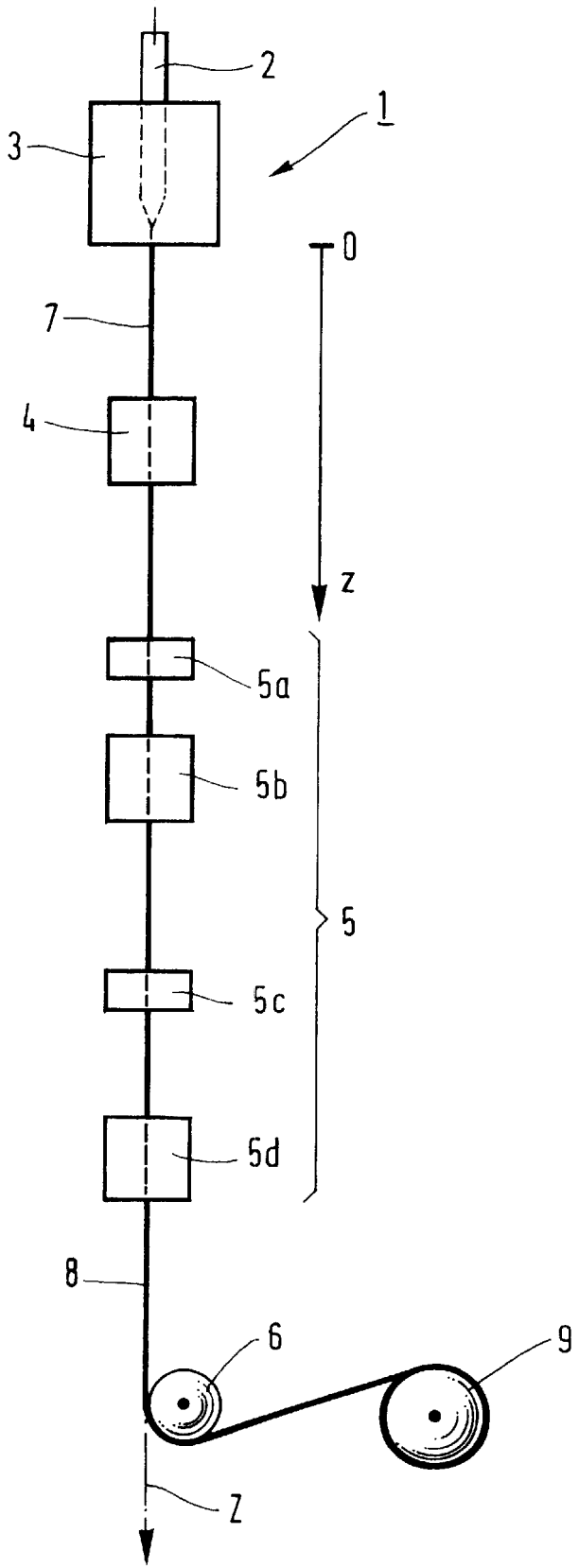
FIG. 1 is a diagrammatic view of a drawing device incorporating a prior art optical fiber cooling device.

FIG. 1 is described above in connection with the prior art. The drawing tower 1 includes a drawing furnace 3, a prior art cooling device 4, a coating device 5, a capstan 6, and a take-up spool 9.

Figure 2:
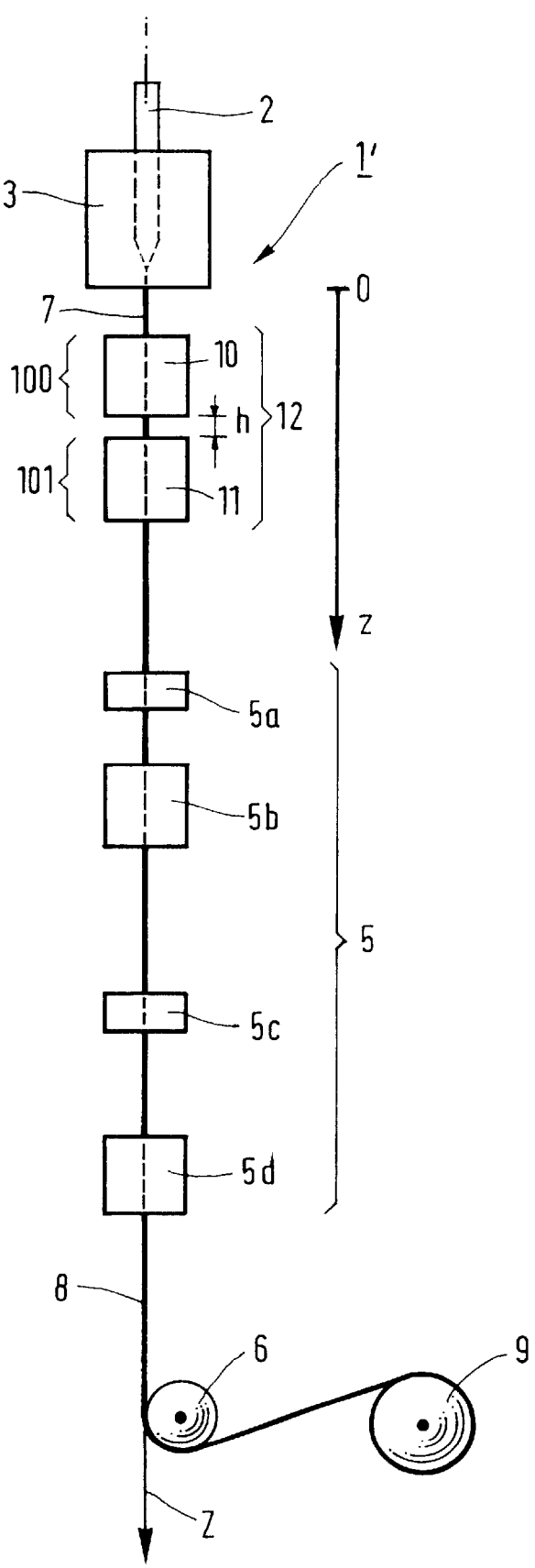
FIG. 2 is a diagrammatic view of a drawing device incorporating an optical fiber cooling device suitable for implementing the method of the invention.

FIG. 2 shows a drawing tower 1' which has the same components as FIG. 1, but the cooling device 12 uses the method of the invention. Said cooling device 12 comprises a first, fast cooling device 10 which defines a fast cooling area 100 and a second, slow cooling device 11 which defines a slow cooling area 101. The two devices are placed one above the other so that the height h of the fiber 7 which is in the open air between said two devices 10 and 11 is as small as possible, given technological and/or economic constraints on the drawing tower 1'. The height is typically a few centimeters, generally between 0 and 15 cm, for example 10 cm. The height is ideally zero.

Figure 3:
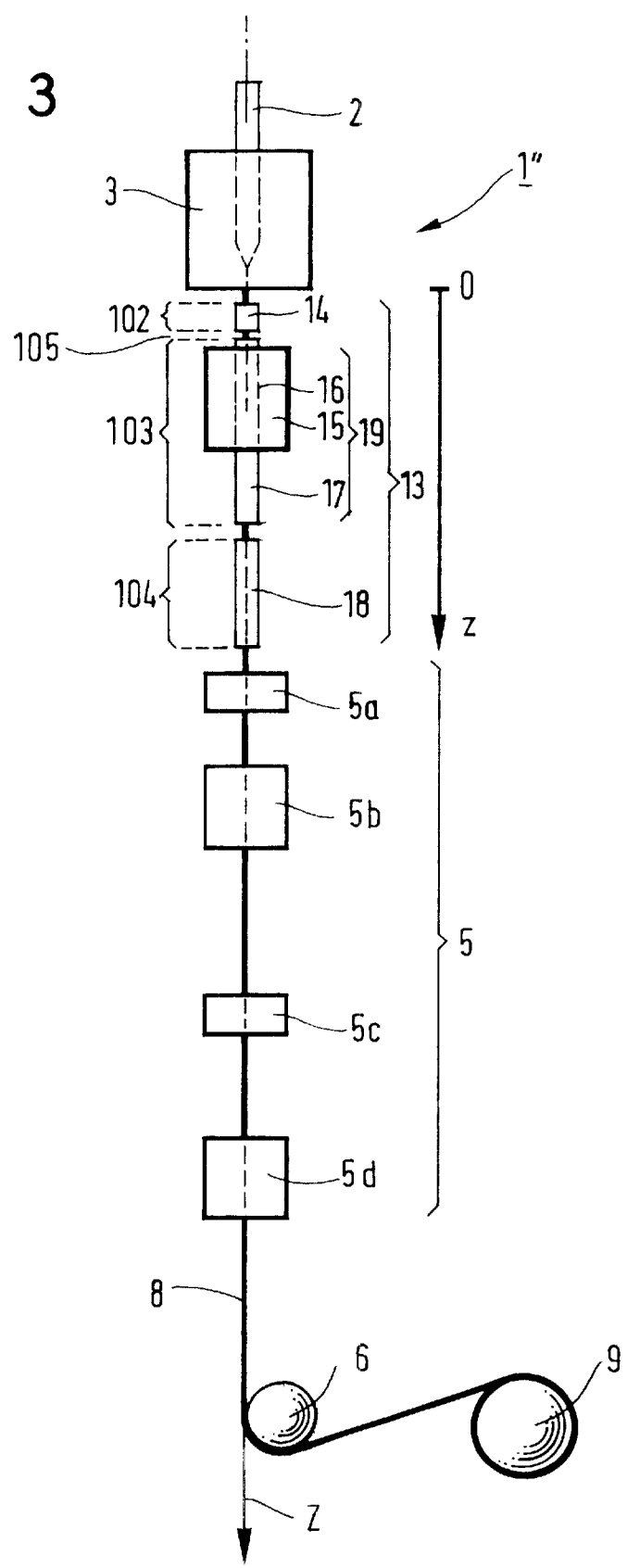
FIG. 3 is a diagrammatic view of an optical fiber cooling device in a particular implementation of the method of the invention.

FIG. 3 shows a drawing tower 1" which has the same components as FIGS. 1 and 2 in which the cooling device 13 uses a particular implementation of the method of the invention. In accordance with the invention, the cooling device 13 is made up of a fast cooling tube 14, a slow cooling device 19, and a fast cooling device 18. The fast cooling tube 14, also referred to as a quenching tube, defines a fast cooling area 102. The tube 14 is followed on the drawing tower 1', in the direction of movement of the fiber 7, by the slow cooling device 19. The device 19, which defines a slow cooling area 103, consists of a heating furnace 15 surrounding a first tube 16 and an extension second tube 17. Finally, the fast cooling device 18 is a tube which defines a fast cooling area 104.

In a variant of the above embodiment, only the devices 14 and 19 are present, the presence of the tube 18 proving not to be necessary, for example because there is sufficient space for cooling the fiber 7 in the surrounding air between the outlet of the slow cooling device 19 and the inlet of the coating device 5. Conversely, the presence of a fast cooling device such as the tube 18 can prove necessary so that the fiber 7 reaches the temperature for entering the coating device 5 in the available space. From this point of view, the device 18 can have practically no further effect on the mechanical and/or optical properties of the fiber 7, the various component parts of the fiber 7 being sufficiently fixed on leaving the slow cooling device 19.

The following example illustrates one particular implementation of the invention without limiting the scope of the invention.

EXAMPLE

A cooling device 13 for implementing the invention like that shown in FIG. 3 was used on a drawing tower 1" which was of the type shown in FIG. 3 except that the tube 18 was omitted. The coated fiber made in said tower 1" was a standard silica-based fiber conforming to the G.652 standard.

The tube 14 was 25 cm long and its wall was maintained at a temperature of 15° C. by heat exchange with a heat-exchange fluid, which was water in this example. The tube was 9 cm below the drawing furnace. The tube 14 defined a fast cooling area 102 in accordance with the invention, also referred to as the quenching area 102. A cooling fluid in the form of gaseous helium flowed inside the tube. The helium flowrate was adjustable to vary the temperature of the fiber on leaving said tube 14. In this example, said flowrate was fixed at 1 liter per minute (l/min) and the temperature of the fiber in the intermediate temperature area 105 was then 1500° C.

The slow cooling device 19 had a total length of 399 cm and was made up of a quartz tube 16 over the wall of which argon flowed at a flowrate of 7 l/min. The tube 16 was 159 cm long and was 8 cm below the tube 14, which defined an area 105, in which the temperature of the fiber 7 could be measured. At a distance of 17 cm from the top of the tube 16 there was a heating furnace 19 which was 83 cm long and which surrounded a part of the tube 16 and heated the wall of said tube 16 to a temperature of 1050° C. The slow cooling device 19 further included a 240 cm long tube 17 just below the tube 16. In this example, the temperature of the fiber on leaving this tube was 925° C.

The cooling device 13 can further include a fast cooling tube 18, of which no example is shown here.

The drawing speed was 900 m/min and the temperature of the fiber 7 on leaving the drawing furnace 3 was 1800° C. The distance between the slow cooling device 19 and the fast cooling tube 18 was 2 m.

For a given device implementing the invention, as described with reference to FIG. 3 for example, and for a given fiber composition and a given drawing speed, the person skilled in the art therefore seeks to determine the optimum temperature in the intermediate area 105, by means of a limited number of tests, in order to determine the critical temperature for subsequent fiber production. Thus the person skilled can determine the optimum configuration of the drawing process for the final optical fiber obtained by it to have minimum attenuation. One example of said tests is given below.

Said tests consisted in varying the temperature of the fiber 7 in the area 105 by modifying the flowrate of the gaseous helium injected into the tube 14 in order to discover the optimum temperature in the intermediate area 105. This was done by measuring the attenuation of the fiber obtained at a given temperature measured in the area 105. Each attenuation test was effected on 25 km of fiber 7. In this example, the tests therefore required the production of six different fibers 7 numbered from 1 to 6.

The test results are set out in the table below:

| Fiber | Temperature of fiber 7 in area 105 (° C.) | Attenuation of fiber 8 at 1550 nm (dB/km) |
|---|---|---|
| 1 | 1550 | 0.1910 |
| 2 | 1500 | 0.1897 |
| 3 | 1450 | 0.1917 |
| 4 | 1400 | 0.1920 |
| 5 | 1350 | 0.1931 |
| 6 | 1280 | 0.1941 |

For example, in the prior art, where there is only slow cooling, for example only the area 19, the attenuation of said fiber is 0.1910 dB/km.

The above table shows an optimum intermediate temperature of approximately 1500° C. for which the fiber attenuation is minimum, other conditions being equal.

The coated optical fiber 8 leaving the drawing tower as described above and having undergone a cooling step comprising fast cooling 14 followed by slow cooling 19 in accordance with the invention therefore has optical properties that are improved, mainly in terms of attenuation, compared to a fiber produced under prior art conditions. What is more, the presence of the fast cooling area enables drawing to be performed at higher speed without it being necessary to increase the height of the drawing tower.

Of course, the method according to the invention is not limited to the implementations described hereinabove. In particular, it is possible to place the cooling device 13 between the bottom of the drawing furnace 3 and the top of the coating device 5 at any distance from the bottom of the drawing furnace 3, provided that the temperature of the fiber in an intermediate area between the two cooling areas is approximately equal to the critical temperature.

What is claimed is:

1. A method of cooling an optical fiber during drawing through contact with at least one cooling fluid in at least two cooling areas,
   the method comprising the steps of:
   effecting fast cooling of the fiber, faster than cooling in surrounding air, from an initial temperature of the fiber to an intermediate temperature of said fiber in a fast one of said cooling areas,
   then, slow cooling the fiber, slower than cooling in the surrounding air, from an intermediate temperature of the fiber to a final temperature of said fiber, in a slow one of said cooling areas, and
   choosing the temperature of the fiber in an intermediate area between the two cooling areas to lie in the range 1200° C. to 1700° C. in the case of fibers based on silica glass, in the range 200° C. to 400°0 C. in the case of fibers based on fluoride glass, or in the range 150° C. to 250° C. in the case of fibers based on polymer materials.

2. The method according to claim 1, further comprising the step of choosing the temperature of the fiber in the intermediate area to be substantially equal to a critical temperature that causes the attenuation of the fiber obtained by the drawing method to be a minimum.

3. A method according to claim 1, wherein the length of the fiber in the intermediate area is as short as possible.

4. The method according to claim 2, wherein, at least locally in the vicinity of the critical temperature, the ratio of instantaneous slopes $dT/dt$, where T is the temperature of the fiber and t is time, for fast cooling in the fast cooling area and for cooling in the surrounding air, is greater than 1.

5. A method according to claim 4, wherein said ratio of the instantaneous slopes is greater than 1.1 in the fast cooling area.

6. A method according to claim 4, wherein said ratio of the instantaneous slopes is from 1.2 to 10 in the fast cooling area.

7. The method according to claim 2, wherein the initial temperature of the fiber on entering the fast cooling area is equal to the critical temperature plus 250° C. to 350° C.

8. A method according to claim 7, wherein the initial temperature of the fiber on entering the fast cooling area is equal to the critical temperature plus 300° C.

9. The method according to claim 2, wherein, at least locally in the vicinity of the critical temperature, the ratio of instantaneous slopes $dT/dt$, where T is the temperature of the fiber and t is time, for slow cooling in the slow cooling area and for cooling in the surrounding air, is less than 1.

10. A method according to claim 9, wherein said ratio of the instantaneous slopes is less than 0.9 in the slow cooling area.

11. A method according to claim 9, wherein said ratio of the instantaneous slopes is from 0.05 to 0.8 in the slow cooling area.

12. The method according to claim 1, wherein, at least in part in the slow cooling area, the ratio of instantaneous slopes $dT/dt$, where T is the temperature of the fiber and t is time, for slow cooling in the slow cooling area and for cooling in the surrounding air, is negative.

13. A method according to claim 2, wherein the final temperature of the fiber on leaving the slow cooling area is equal to the critical temperature minus 50° C. to 950° C.

14. A method according to claim 13, wherein the final temperature of the fiber on leaving the slow cooling area is equal to the critical temperature minus 500° C.

15. A method according to claim 2, wherein, for a standard stepped index silica-based optical fiber conforming to CCITT Standard G.652, said critical temperature is in the range 1350° C. to 1550° C.

* * * * *